Dec. 13, 1955  R. TUCKER  2,726,651
MASONRY SAW
Filed July 12, 1954  3 Sheets-Sheet 1
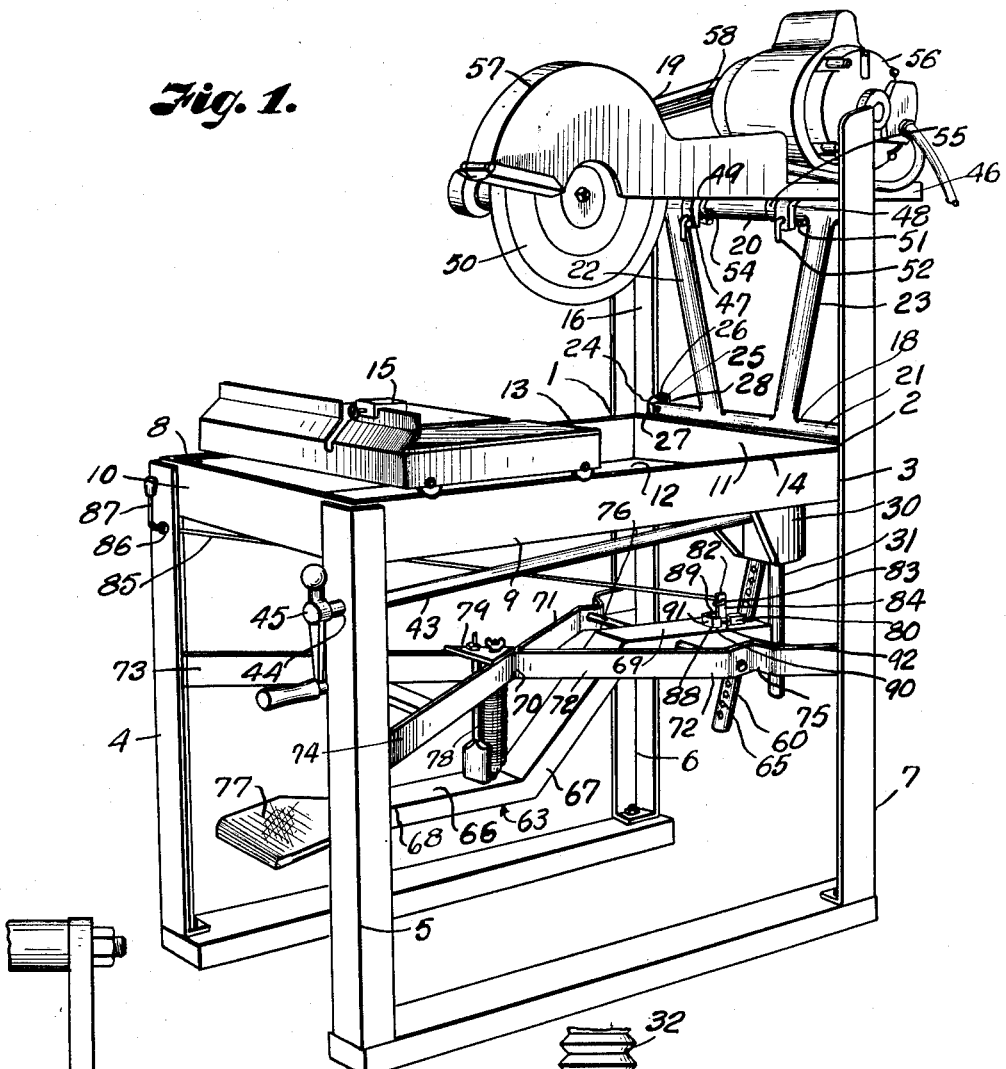
INVENTOR.
Ray Tucker
BY
Fishburn & Mullendore
ATTORNEYS.

Dec. 13, 1955   R. TUCKER   2,726,651
MASONRY SAW
Filed July 12, 1954   3 Sheets-Sheet 2
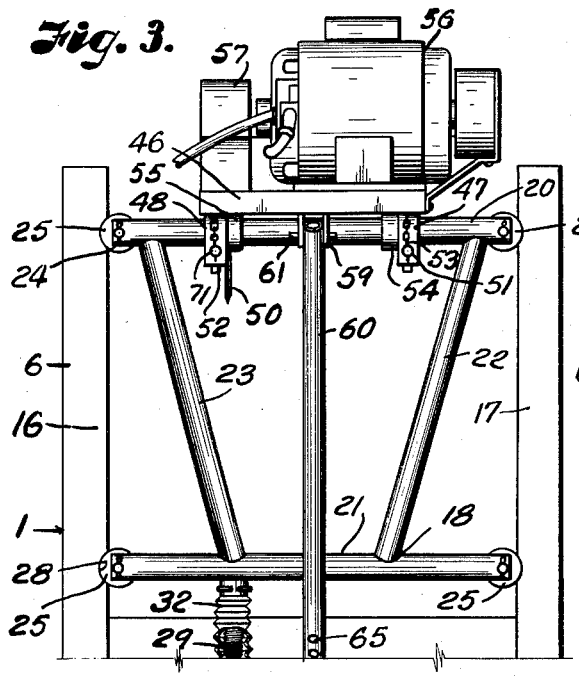
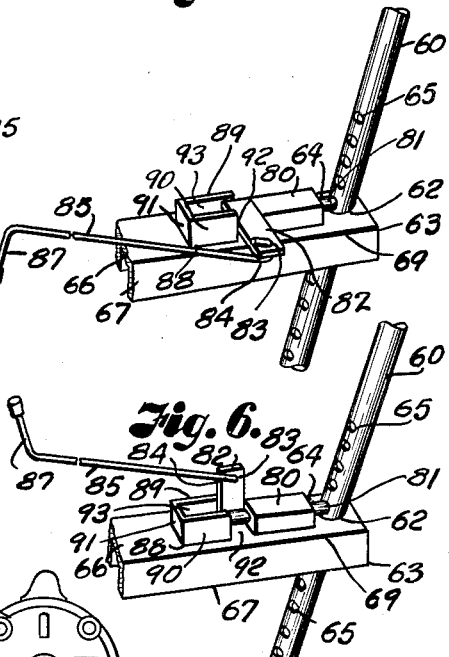
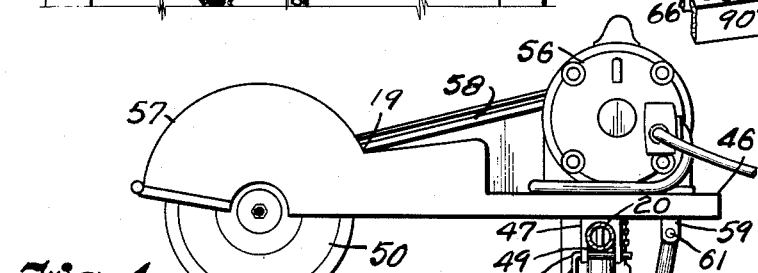
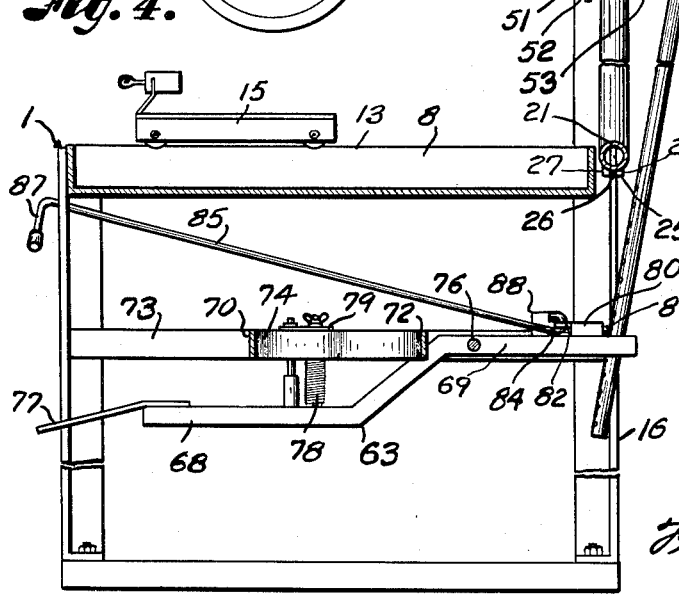
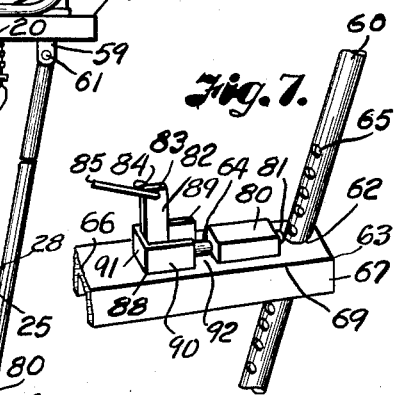
INVENTOR.
Ray Tucker
BY
Fishburn & Mullendore
ATTORNEYS.

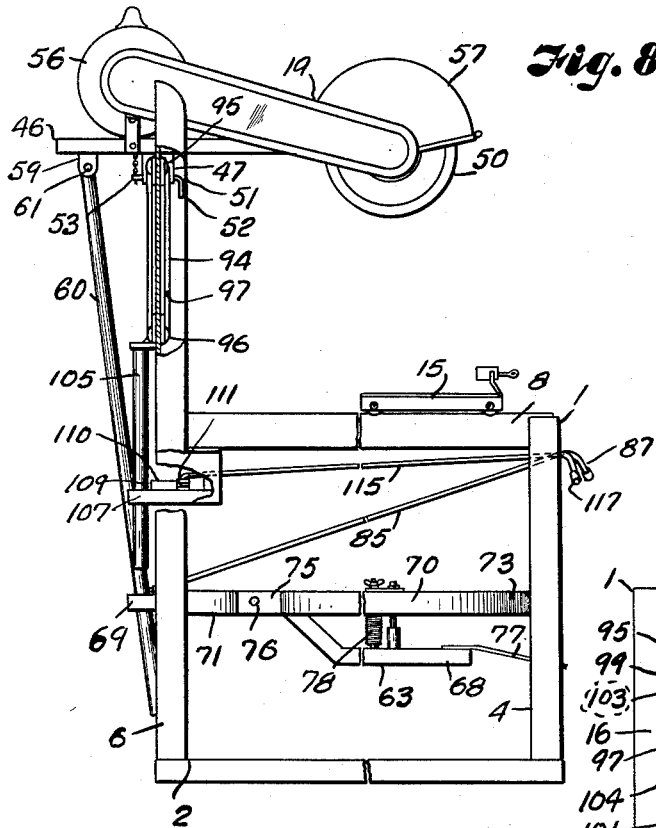

United States Patent Office 2,726,651
Patented Dec. 13, 1955

2,726,651
MASONRY SAW

Ray Tucker, Kansas City, Mo., assignor to Robert G. Evans Company, Kansas City, Mo., a partnership Application July 12, 1954, Serial No. 442,471

5 Claims. (Cl. 125—13)

This invention relates to a masonry saw for cutting various types of tile, bricks, concrete blocks and like articles to shape and size, and more particularly to a masonry saw including a cutting head vertically and pivotally moveable relatively to a work support.

The principal object of the invention is to provide a vertically moveable carriage on which the cutting head is pivotally mounted.

A further object of the invention is to provide a mounting of the cutting head that facilitates movement thereof to the exact position that gives personal safety to the operator and produces a faster cut.

Other objects of the invention are to provide vertical guides on which the carriage is mounted and which retains the cutter in accurate alignment with the work; to provide an easily operable mechanism for raising and lowering the carriage; to provide a foot lever and link connection with the cutting head to effect pivotal movement of the head on the carriage; to provide an adjustable connection between the foot lever and link to compensate for change in position of the carriage; to provide the connection with a positively operated bolt adapted to be locked in its respective positions; to provide a uniform balance of the cutting head on the carriage and return of the saw head after each cutting operation regardless of the adjusted height of the carriage; and to provide for a quick and easy detachment of the saw head from the carriage.

In accomplishing these and other objects of the invention hereinafter pointed out, I have provided improved structure the preferred forms of which are illustrated in the accompanying drawings wherein:

Fig. 1 is a perspective view of a masonry saw constructed in accordance with the present invention.

Fig. 2 is an enlarged fragmentary view partially in section particularly illustrating the mechanism for raising and lowering the carriage to which the cutting head is pivotally mounted.

Fig. 3 is a rear view of the carriage and cutting head.

Fig. 4 is a longitudinal section through the saw.

Fig. 5 is a fragmentary perspective view particularly illustrating the locking connection between the foot lever and the link or rod by which the cutting head is pivotally moved on the carriage, the bolt of the lock being shown in position to make the connection.

Fig. 6 is a similar view illustrating unlocking of the bolt for retraction.

Fig. 7 is a similar view but showing the locking bolt in retracted position.

Fig. 8 is a side elevational view of a modified form of the invention, with portions of the saw frame being broken away to better illustrate the construction.

Fig. 9 is a rear elevational view of the form of the invention shown in Fig. 8.

Fig. 10 is a horizontal section on the line 10—10 of Fig. 9.

Referring more in detail to the drawings and first to the form of invention illustrated in Figs. 1 to 7 inclusive:

1 designates a masonry saw constructed in accordance with the present invention and which includes a frame 2 having a rectangular pan-shaped top 3 supported at the corners on legs 4—5 and 6—7. The top 3 includes sides 8—9 and ends 10—11 and a bottom 12. The sides 8—9 form tracks 13—14 for reciprocably mounting a work carrier 15 thereon. The rear legs 6—7 extend upwardly from the top 3 and have facing flanges 16 and 17 respectively to provide vertical guides or tracks for a carriage 18 which supports a saw head 19. The carriage 18 includes upper and lower cross members 20 and 21 connected by diverging members 22 and 23 as shown in Fig. 3.

The ends of the cross members 20 and 21 have slots 24 registering with the flanges 16 and 17 to contain rollers 25. The rollers 25 have grooved peripheries 26 to provide side flanges 27 and 28 to engage the front and rear sides of the flanges 16 and 17 for retaining the carriage on the guide tracks, whereby it may be readily raised and lowered to position the cutting head 19 as later described.

In this form of the invention, the carriage 18 is raised and lowered by means of a jack-screw 29 that has its upper end fixed to the lower cross member 21 preferably below the connection with the brace member 23. The jack-screw extends through a gear casing 30 and into a lower tubular housing 31. The upper end is enclosed by a bellows 32 having one end attached to the jack-screw and its other end to the gear casing 30 to protect the threads of the shaft from dirt, cuttings and the like that accumulate about the saw. Rotatably seated upon a bearing 33 carried by the bottom 34 of the gear casing is a bevel gear 35. The bevel gear 35 has internal threads 36 engaging the threads 37 of the jack-screw 29 to provide an adjustable support for the carriage 18. Also contained within the gear casing 30 is a pinion gear 38 having teeth 39 meshing with the teeth 40 of the gear 35. The pinion gear 38 is rotatably journalled in a bearing opening 41 in the front wall 42 of the gear casing 30 and is fixed to a shaft 43 that extends forwardly under the top 3 and has its forward end rotatably mounted in a bearing opening 44 in the upper end portion of the leg 5. A crank 45 is mounted on the projecting end of the shaft 43 to rotate the gears 35 and 38 to turn the jack-screw for raising or lowering the carriage depending upon the direction of the rotation of the crank.

It is thus apparent that the carriage is readily raised or lowered upon turning of the crank and that when the crank is released the jack-screw is retained in its adjusted position to securely lock the carriage at the position to which it has been elevated or lowered.

The cutting head 19 includes an elongated frame 46 arranged transversely of the carriage and has depending lugs 47 and 48 provided with downwardly opening notches 49 to provide a saddle-like support for the cutting head on the upper cross member 20 of the carriage and on which the cutting head is pivoted to swing a saw 50 into and out of cutting position with respect to the work that is mounted on the work carrier 15. The frame of the cutting head is retained on the cross member 20 of the carriage 18 by pins 51 that are projected through the lugs below the cross member, the pins having heads 52 by which they may be easily withdrawn and which cooperate with cotterpins 53 to retain the pins in lugs. The frame 46 of the cutting head is retained from lateral movement on the cross member 20 by providing the cross member with collars 54 and 55 that engage the innerface side of the lugs 47 and 48 as best shown in Fig. 3. The rear end of the cutting head frame provides a mounting for a motor 56 which is preferably positioned over the carriage to balance the forward end of the frame 46 and the saw or cutting element 50 that is carried thereon. The saw or cutting element 50 is suitably journalled on the frame and rotates within a guard 57. The saw is driven by the motor 56 through a pulley and belt connection indicated at 58.

Also depending from the frame of the cutting head at a point midway between the lugs 47 and 48 and spaced rearwardly from the cross member 20 of the carriage are spaced ears 59 pivotally connected with the upper end of a link or rod 60 by means of a pin 61. The pin 61 is also removable along with the retaining pins 51 and extends through the ears and through the upper end of the link 60 as best shown in Fig. 3. The link 60 is preferably tubular and depends from the ears 59 to pass slidably through an opening 62 in the rear end of a foot lever 63 to which the link is connected by means of a sliding bolt 64, the depending end of the link being provided with a series of spaced apertures 65, anyone of which is adapted to receive the bolt to form the desired connection after a vertical adjustment of the carriage as later described.

The foot lever 63 is preferably of channel cross section and has a web portion 66 and side flanges 67. The forward end 68 of the lever is preferably off-set below the rear end 69 as shown in Figs. 1 and 4 to pass the forward end of the lever under a leg brace 70 on which the rear end of the lever is pivotally mounted. The brace 70 has rearwardly diverging arms 71 and 72 and forwardly diverging arms 73 and 74 connected with the legs 6—7 and 4—5 respectively. The rear arms 71 and 72 of the leg brace have off-set portions 75 journalling the ends of a cross shaft 76 that extends through the side flanges 67 of the foot lever and under the web portion 66, as shown in Figs. 1 and 4, to pivotally mount the foot lever. The opening 62 is formed in the web portion 66 at the rear end off-set 69 while the web portion at the forward end of the lower off-set 68 carries a foot pedal or plate 77. The end 68 of the foot lever is yieldingly retained in its uppermost position by means of coil spring 78 having one end connected with the foot lever and its upper end adjustably connected with a cross plate 79 that is carried by the rearwardly diverging arms 71 and 72 of the leg brace 70 as shown in Fig. 1.

The bolt 64 is reciprocably and oscillatably mounted in a block 80 that is fixed to the web portion 66 of the foot lever forwardly of the opening 62. The forward end 81 of the bolt projects from the block 80 and carries a laterally extending arm 82. The arm 82 has an opening 83 and extending through the opening 83 is a hooked end 84 of an actuating rod 85. The opposite end of the rod 85 is slidably oscillatable in an opening 86 formed in the flange of the leg 4, as shown in Fig. 1, and the projecting end of the rod terminates in a laterally extending handle 87 by which the rod may be oscillated to turn the locking bolt within the block 80 and to effect reciprocation of the bolt when the rod is pulled outwardly or pushed inwardly as when disconnecting and connecting the foot lever 63 with the link 60.

In order to lock the slide bolt 64 in its respective positions, the web portion of the foot lever also carries a guide 88 having spaced apart flanges 89 and 90 connected at their rear ends by a cross flange 91, with the flanges being welded to the web portion of the foot lever in alignment with the sides of the block 80. The flange 89 is of longer length than the flange 90 to provide a back-stop for the arm 82 and to provide a locking engagement of the arm, when the arm is turned into the space 92 between the end of the block 80 and the end of the flange 90, as shown in Fig. 5, so that the bolt 64 is locked into engagement with one of the openings 65 in the connecting link 60. The spaced apart flanges 89 and 90 also provide a socket 93 into which the arm 82 is contained when the bolt is in retracted position.

The form of the invention illustrated in Figs. 8 to 10 inclusive is similar to the form of the invention just described with the exception of the carriage 18 and the mechanism for vertically adjusting the carriage on the guide tracks.

In this instance, the carriage 94 includes cross members 95 and 96 connected at the ends by vertical bars 97 and 98 and fixed to the upper and lower ends of the bars 97 and 98, in facing relation with the guide flanges 16 and 17, are slide blocks or shoes 99—100 and 101—102 having grooves 103 containing the edges 104 of the flanges whereby the carriage is retained for fixed vertical movement to adjust the cutting height of the head. The slide blocks are thus substituted for the rollers in the first described form of the invention. The raising and lowering of the carriage is effected manually in this form of the invention and therefore the jack-screw and operating gears are omitted and substituted therefor is a tubular rod 105 that depends from the lower cross member 96 of the carriage and passes through an opening 106 of a bracket 107 that depends from the end of the pan-like top 3. The tubular rod 105 has a series of spaced apertures 108, anyone of which is adapted to be engaged by a bolt 109. The bolt 109 is rotatably and reciprocably mounted in a guide block 110 that is carried by the bracket 107 forwardly of the opening 106 through which the tubular rod 105 passes. The bolt 109 projects from the forward end of the guide block 110 and carries a lateral arm 111 similar to the arm 82 on the bolt connection for the foot lever. The arm 111 is adapted to be locked between a flange 112 of a guide 113 and the end of the block 110 when the arm is turned laterally with the bolt in projecting relation with one of the apertures of the depending rod 105 as shown in Fig. 10. The guide also forms a socket 114 into which the arm is drawn when the arm is in vertical position and the bolt is retracted. The arm is actuated by a rod 115 that extends forwardly through an opening 116 in the leg 4 and the projecting end has a laterally turned handle 117. Otherwise, the structure is the same as the structure previously described and corresponding numbers are used on the like parts.

In using the form of invention shown in Figs. 1 to 7, inclusive, the cutting head 19 is adjusted for height relatively to the thickness of the tile placed upon the carrier 15. This is effected by turning the crank 45 in the proper direction. When the crank 45 is turned, the shaft 43 is rotated so that the pinion gear 39 rotates the gear 35 and the threaded connection thereof with the jack-screw raises or lowers the jack-screw within the casing 30, depending upon the direction of rotation. Movement of the jack-screw shifts the carriage 18 with the rollers 24 operating on the flanges 16 and 17 of the rear legs 6—7 of the frame. Movement of the carriage 18 may tilt the frame of the cutting head 19 because the bolt 64 is engaged with the rod 60. However, the cutting head may be kept in desired position by turning the handle 87 on the rod 85 to release the arm 82 of the bolt from engagement with the space 92, the handle 87 is then pulled forwardly to shift the rod 85 and draw the arm 82 into the socket 93 of the guide 88. This withdraws the end 81 of the bolt out of engagement with the apertures 65 whereupon the saw end of the frame 46 may be pivoted upwardly or downwardly as desired, with the frame rocking upon the cross member 20 of the carriage.

The connection between the link or rod 60 and the foot lever is reestablished by pushing the handle 87 forwardly until the arm 82 again registers with the space 92 whereon the fore-end 81 of the bolt 64 has entered an aperture 65. The handle 87 is then turned so that the arm 82 again engages in the space 92 to lock the bolt in connection with the rod or link 60. When the motor is in operation, the belt connection 58 drives the saw or blade 50. The saw or blade 50 is brought into contact with the work by pressure of the foot applied to the pedal 77. This rocks the foot lever on the shaft 76 to raise the rear end of the lever so that the link or rod connection 60 with the cutting head rocks the cutting head on the upper cross member 20 into contact with the work for effecting the desired cut as the carrier 15 is moved along the tracks 13 and 14.

In the form of the invention illustrated in Figs. 8 to 10 inclusive, the carriage 94 is raised by releasing the bolt 109 from engagement with one of the apertures 108 in the rod 105, while the operator is manually supporting the forward end of the cutting head. The forward end of the cutting head is then lifted so that the cutting head rocks upon the pin connection 61. This lifts the carriage 94 with the shoes 99—100 and 101—102 thereof sliding along the edges 104 of the rear legs of the machine. The carriage is then locked in the adjusted position by reengaging the bolt 109 with the nearest aperture 108 in the rod 105. The tilt of the cutting head may then be corrected by manipulation of the handle 87 to effect release of the bolt 64 from the rod or link 60. The cutting head may then be tilted upon the upper cross member 95 of the carriage 94 to bring it into proper position relatively to the article to be cut. If a greater movement of the carriage 94 is required, the handle 117 is again manipulated to release the bolt 109 whereupon lifting of the cutting head again raises the carriage 94 as previously described.

If it is desired to lower the cutting head, the above operations are reversed, that is upon release of the bolt 109 the cutting head will be moved downwardly on the pivot 61 to lower the carriage after which the bolt will be reengaged to support the carriage and the handle 87 will be manipulated to release the bolt 64 to permit repositioning of the cutting head after which the bolt 64 is again connected with the rod or link 60 as above described.

From the foregoing it is obvious that I have provided a mounting of the cutting head in a manner to facilitate movement thereof to the exact position that gives personal safety to the operator and produces a faster cut because the saw is readily brought into a position relatively to the work where a more satisfactory cut is produced.

It is also obvious that the cutting head is quickly and easily adjusted with little effort on the part of the operator and that the mounting supports the cutting head in fixed relation with the frame so that there is no possibility of the cutting head jumping out of position or moving out of alignment with an intended cut through an article when placed upon the work carrier.

What I claim and desire to secure by Letters Patent is:

1. In a masonry saw of the type including a frame, a cutting head pivotally mounted on the frame, and a lever for pivoting the cutting head, means adjustably and releasably connecting the lever with the cutting head including a link carried by the cutting head and slidable through an opening in the foot lever, said link having a series of apertures, a bolt releasably engageable with respect to one of said apertures, means for reciprocably and oscillatably mounting the bolt on the lever, a laterally extending arm on the bolt, spaced apart flanges on the lever for guiding the bolt therebetween and having a transverse stop connecting said flanges for stopping the bolt when the bolt is in retracted position, one of said flanges being shorter than the other with the shorter flange being engaged by the arm to lock the bolt when the bolt is in projected position and the longer flange forming a stop for the arm when the bolt is turned to bring said arm into registry with the space between said flanges, and bolt actuating means connected with said arm and reciprocably oscillatable in a part of the frame to move the bolt through its respective positions.

2. In a masonry saw of the type including a frame having spaced apart vertical guides, a carriage, means fixing the carriage for vertical movement on the guides, a cutting head pivotally mounted on the carriage, means on the frame for supporting the carriage at fixed elevations with respect to the guides, a foot lever mounted on the frame, a link having fixed pivotal connection with the cutting head and having a portion provided with a longitudinal series of apertures extending through an opening in the foot lever, and means for connecting the foot lever with said link in accordance with the different elevations of the carriage wherein said connecting means includes a bolt projectable into any one of said apertures to make said connection and retractable to release said connection, means on the lever for reciprocably and oscillatably mounting the bolt on said lever, a laterally extending arm on the bolt, means on the lever for guiding the arm and for preventing turning of the bolt during reciprocation of said bolt, said guide means having a part engageable with said arm on the bolt to lock the bolt in said projected position upon turning of the bolt in one direction in said bolt mounting means, a rod connected with said arm and having oscillatable and slidable support in a part of the frame to effect reciprocation of the bolt to and from said projected position and to turn the arm into and out of locking engagement with said part of the guide means when the bolt is in said projected position.

3. In a masonry saw including a frame having spaced apart vertical guides, a carriage, means fixing the carriage for vertical movement on the guides, a cutting head pivotally mounted on the carriage, a rod depending from the carriage, a bracket on the frame having an opening for passing the end of the rod slidably therethrough, means for connecting the rod with said bracket for supporting the carriage at fixed elevations with respect to the guides, a foot lever mounted on the frame, a link having pivotal connection with the cutting head and having a portion extending through an opening in the foot lever, means for connecting the foot lever with said link in accordance with the different elevations of the carriage, said means being alternately operable to render the pivotal mounting of the cutting head and pivotal connection of the link alternately effective when the cutting head is pivoted to effect movement of the carriage to said different elevations.

4. In a masonry saw including a frame having spaced apart vertical guides, a carriage, means fixing the carriage for vertical movement on the guides, a cutting head pivotally mounted on the carriage, a rod depending from the carriage and having a series of spaced apertures in the longitudinal direction thereof, a bracket on the frame having an opening for passing the apertured end of the rod slidably therethrough, means for connecting the rod with said bracket for supporting the carriage at fixed elevations with respect to the guides, a foot lever mounted on the frame, a link having fixed pivotal connection with the cutting head and having a portion provided with a longitudinal series of apertures extending through an opening in the foot lever, means for connecting the foot lever with said link in accordance with the different elevations of the carriage, each of said connecting means including a bolt projectable into any one of said apertures of the link and rod with which they are associated to make said connections and retractable to release said connections, means for reciprocably mounting the bolts on said lever and bracket respectively, a rod connected with each of said bolts and slidable in parts of the frame to effect reciprocation of the bolts to and from said projected positions, said bolts being alternately operable to render the pivotal mounting of the cutting head and pivotal connection of the link alternately effective when the cutting head is pivoted to effect movement of the carriage to said different elevations.

5. In a masonry saw including a frame having spaced apart vertical guides, a carriage, means fixing the carriage for vertical movement on the guides, a cutting head pivotally mounted on the carriage, a rod depending from the carriage and having a series of spaced apertures, a bracket on the frame having an opening for passing the rod slidably therethrough, means for connecting the rod with said bracket for supporting the carriage at fixed elevations with respect to the guides, a foot lever mounted on the frame, a link having fixed pivotal connection with the cutting head and having a portion provided with a longitudinal series of apertures extending through an opening in the foot lever, means for connecting the foot lever with said link in accordance with the different elevations of the carriage, each of said connecting means including a bolt projectable into any one of said apertures of the link and rod with which they are associated to make said connections and retractable to release said connections, means for reciprocably and oscillatably mounting the bolts on said lever and bracket respectively, a laterally extending arm on each bolt, means on the lever and bracket for guiding the arms and for preventing turning of the bolts during reciprocation of said bolts, each of said guide means having a part engageable with said arms of the bolts to lock the bolts in said projected position upon turning of the bolts in said bolt mounting means, a rod connected with each of said arms and oscillatable and slidable in parts of the frame to effect reciprocation of the bolts to and from said projected position and to turn the arms into and out of locking engagement with said parts of the guide means when the bolts are in said projected position, said bolts being alternately operable to render the pivotal mounting of the cutting head and pivotal connection of the link alternately effective when the cutting head is pivoted to effect movement of the carriage to said different elevations.

References Cited in the file of this patent

UNITED STATES PATENTS

| | | |
|---|---|---|
| 2,171,024 | Coates | Aug. 29, 1939 |
| 2,514,826 | Zuzelo | July 11, 1950 |
| 2,581,777 | Wright | Jan. 8, 1952 |
| 2,591,206 | Scott | Apr. 1, 1952 |
| 2,682,262 | Schultz | June 29, 1954 |